(12) United States Patent
Wang et al.

(10) Patent No.: US 10,642,421 B2
(45) Date of Patent: May 5, 2020

(54) ELECTRONIC DEVICE

(71) Applicant: ASUSTeK COMPUTER INC., Taipei (TW)

(72) Inventors: Yi-Ou Wang, Taipei (TW); Wei-Ting Wong, Taipei (TW); Ching-Fu Hsu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/388,987

(22) Filed: Apr. 19, 2019

(65) Prior Publication Data

US 2020/0019259 A1    Jan. 16, 2020

(30) Foreign Application Priority Data

Jul. 13, 2018    (TW) .............................. 107124366 A

(51) Int. Cl.
| | |
|---|---|
| *G06F 3/0354* | (2013.01) |
| *G06F 3/042* | (2006.01) |
| *G06F 1/16* | (2006.01) |
| *G02B 1/11* | (2015.01) |

(52) U.S. Cl.
CPC ................ *G06F 3/042* (2013.01); *G02B 1/11* (2013.01); *G06F 1/169* (2013.01); *G06F 1/1616* (2013.01); *G06F 1/1637* (2013.01)

(58) Field of Classification Search
CPC .... G06F 1/169; G06F 3/03547; G06F 3/0414; G06F 1/1643; G06F 1/1615; G06F 3/0354; G06F 3/038

See application file for complete search history.

(56) References Cited

U.S. PATENT DOCUMENTS

| | | | |
|---|---|---|---|
| 9,389,721 B2 | 7/2016 | Lackey | |
| 2010/0079404 A1* | 4/2010 | Degner | ............... G06F 3/03547 345/174 |

FOREIGN PATENT DOCUMENTS

| | | |
|---|---|---|
| CN | 203689477 U | 7/2014 |
| GB | 2464584 A | 4/2010 |
| TW | 201017379 A | 5/2010 |
| TW | 201327291 A1 | 7/2013 |
| TW | I579743 B | 4/2017 |

* cited by examiner

*Primary Examiner* — Dennis P Joseph
(74) *Attorney, Agent, or Firm* — McClure, Qualey & Rodack, LLP

(57) ABSTRACT

An electronic device includes a case, a supporting structure, a touch display module, and an elastic switch. The case has an opening. The supporting structure is connected to and disposed in the case and covers the opening of the case. The touch display module includes a protecting layer and a display element connected to the protecting layer. The protecting layer is connected to a side of the supporting structure adjacent to the opening of the case. The display element is located between the protecting layer and the supporting structure and separated from the supporting structure. The elastic switch is located at a side of the supporting structure opposite to the opening of the case. When the supporting structure moves partially away from the opening of the case, the elastic switch is pressed toward the case.

13 Claims, 14 Drawing Sheets

ELECTRONIC DEVICE

CROSS-REFERENCE TO RELATED APPLICATION

This application claims the priority benefit of Taiwan Application Serial No. 107124366, filed on Jul. 13, 2018. The entirety of the above-mentioned patent application is hereby incorporated by reference herein and made a part of specification.

BACKGROUND OF THE INVENTION

Field of the Invention

The disclosure relates to an electronic device.

Description of the Related Art

In general, a notebook computer is mainly provided with a display and a host, and is operated with a mouse and/or a touchpad. The host comprises a keyboard and the touchpad. By operating the keyboard and/or the touchpad, information is input into the notebook computer, and information is displayed a correspondingly by the display.

BRIEF SUMMARY OF THE INVENTION

According to an aspect of the disclosure, an electronic device is provided herein. The electronic device includes: a case, having an opening; a supporting structure, connected to and disposed in the case and covering the opening of the case; a touch display module, comprising a protecting layer and a display element connected to the protecting layer, wherein the protecting layer is connected to a side of the supporting structure adjacent to the opening of the case, and the display element is located between the protecting layer and the supporting structure and separated from the supporting structure; and an elastic switch, located at a side of the supporting structure opposite to the opening of the case, wherein when the supporting structure moves partially away from the opening of the case, the elastic switch is pressed toward the case.

In summary, the elastic switch of the disclosure is disposed below the touch display module. Therefore, when a user presses the touch display module, the touch display module is pressed down by the supporting structure to produce physical feedback in response to the pressing of the user, such that the user operates the electronic device more accurately. Moreover, since the elastic switch of the disclosure is disposed below the touch display module, a space below the touch display module is effectively utilized, thereby reducing the size of the electronic device and being convenient for the user to carry.

Furthermore, the side wall of the supporting structure of the disclosure has a first height relative to the protecting layer. The display element has a second height relative to the protecting layer. The first height of the side wall is greater than the second height of the display element. Since the bottom plate is connected to an end of the side wall opposite to the protecting layer, a distance between the bottom plate and the protecting layer is greater than the height of the side wall, thereby preventing the bottom plate from contacting the display element and damaging the display element when the user presses the touch display module.

DETAILED DESCRIPTION OF THE EMBODIMENTS

Figure 1A:
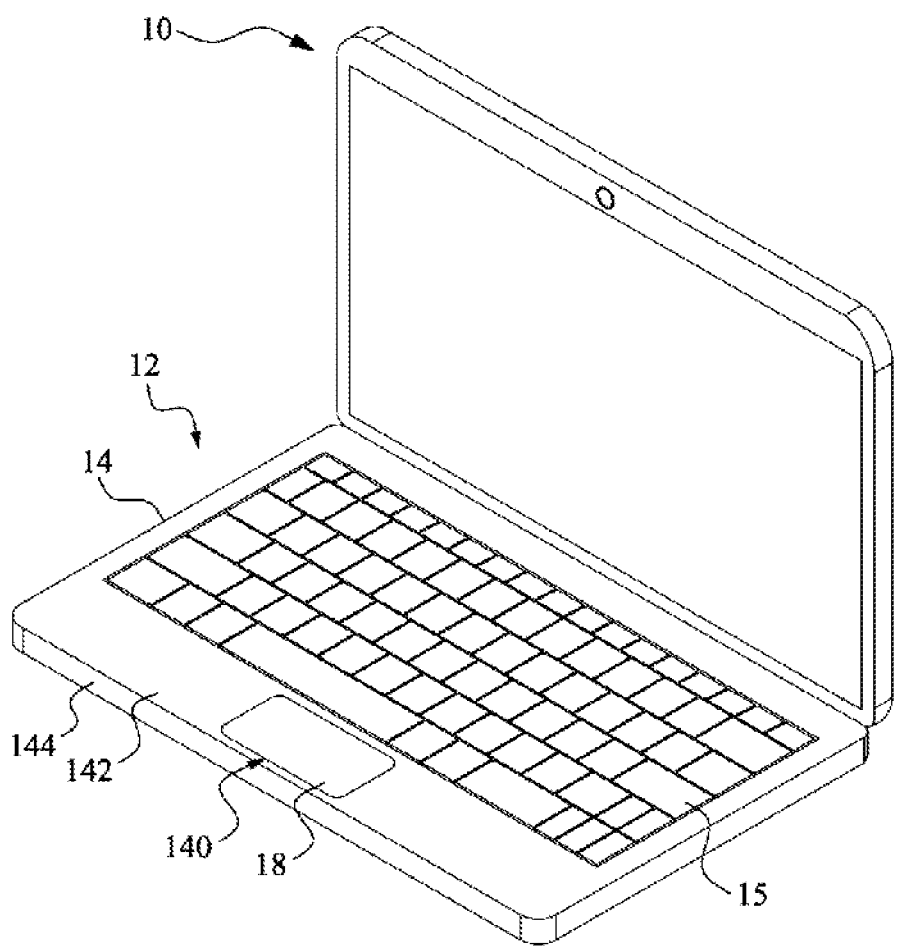
FIG. 1A illustrates a three-dimensional view of an electronic device according to an embodiment of the disclosure.

The following description will provide numerous different implementations or embodiments for implementing the subject matter of the disclosure. Specific examples of elements or arrangements will be discussed below to simplify the disclosure. Definitely, these descriptions are merely some examples and the disclosure is not limited thereto. For example, forming a first feature on or above a second feature includes not only embodiments in which the first feature is in direct contact with the second feature, but also embodiments in which there is another feature formed between the first feature and the second feature and the first feature is not in direct contact with the second feature. Further, in the disclosure, reference numerals or expressions may be repeated in different examples. The purpose of repetition is to simplify and clarify the description, rather than to define the relationship between different embodiments and configurations discussed.

Furthermore, spatially relative terms such as "under", "below", "lower than", "on", and "above" are used herein for convenience in describing the relationship between one element or feature and another element or feature in the drawings. Spatially relative terms encompass other orientations of the device in use or operation in addition to the orientations depicted in the drawings. That is, when the orientation of the device is different from that of the drawings (rotated 90 degrees or in other orientations), the spatially relative terms used herein are also to be interpreted accordingly.

Figure 1B:
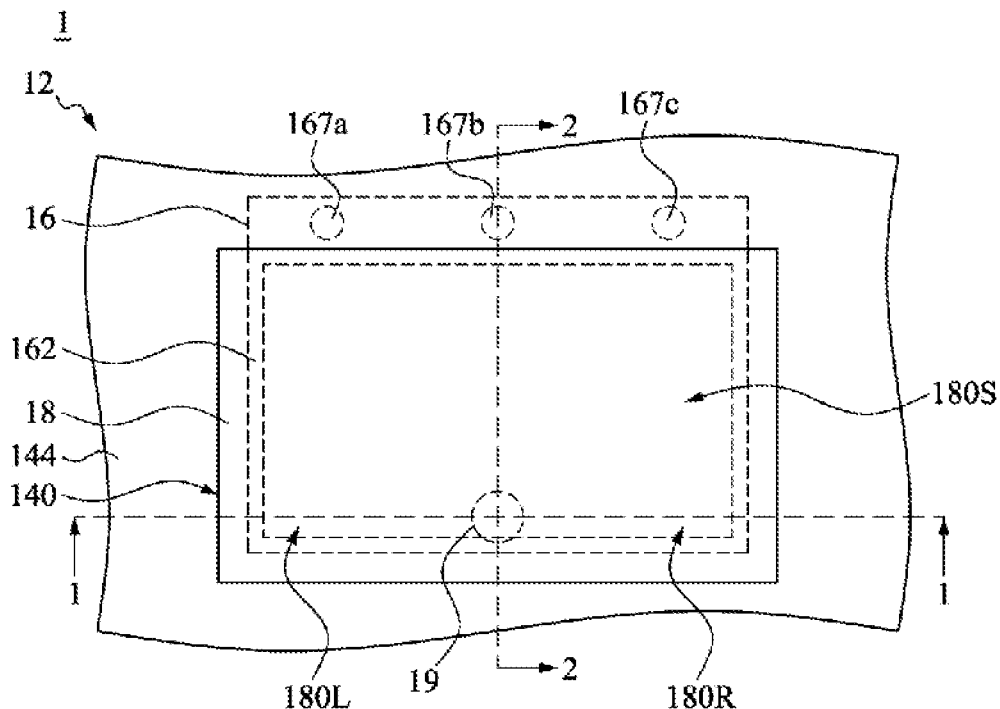
FIG. 1B illustrates a partial structure top view of an electronic device according to an embodiment of the disclosure.
Figure 1C:
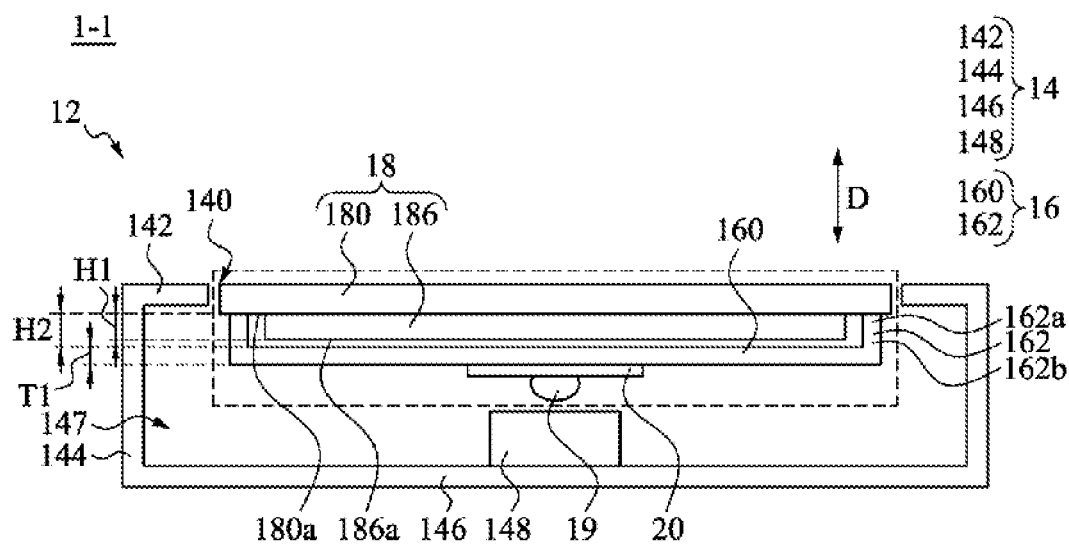
FIG. 1C is a cross-sectional view of a structure shown in FIG. 1B taken along a line segment 1-1, wherein the touch display module is not pressed.

Refer to FIG. 1A, FIG. 1B and FIG. 1C. FIG. 1A illustrates a three-dimensional view of an electronic device 1 according to an embodiment of the disclosure. FIG. 1B illustrates a partial structure top view of an electronic device 1 according to an embodiment of the disclosure. FIG. 1C is a cross-sectional view of a structure shown in FIG. 1B taken along a line segment 1-1, wherein a touch display module 18 in the electronic device 1 is not pressed. As shown in FIG. 1A, in this embodiment, the electronic device 1 includes a first body 10 and a second body 12 that are pivotally connected to each other. In FIG. 1A, the first body 10 includes a display screen, and the second body 12 includes an input unit, but the disclosure is not limited thereto. In other embodiments, any suitable device is applied to the first body 10 and/or the second body 12. In this embodiment, the electronic device 1 is a notebook computer, but the disclosure is not limited thereto.

As shown in FIG. 1A, the second body 12 includes a case 14 and an input unit, such as a keyboard assembly 15, and a touch display module 18. As shown in FIG. 1B and FIG. 1C, the second body 12 further includes a supporting structure 16 located in the case 14, an elastic switch 19, a circuit board 20 and a motherboard (not shown). In this embodiment, the case 14 of the second body 12 includes a top plate 142, a side wall 144, a base 146 and a pressing member 148 (see FIG. 1C), and has an opening 140 formed in the top plate 142. The side wall 144 of the case 14 surrounds the top plate 142 and is connected between the top plate 142 and the base 146 to form an accommodating space 147. The keyboard assembly 15 (see FIG. 1A) is disposed on the top plate 142 of the second body 12. The pressing member 148 is disposed in the accommodating space 147 of the case 14 and connected to the base 146, but the disclosure is not limited thereto. In some embodiments, the pressing member 148 is connected to the side wall 144 or the top plate 142 of the case 14.

In this embodiment, the touch display module 18 is embedded in the opening 140 of the case 14. As shown in FIG. 1C, the touch display module 18 includes a first protecting layer 180 and a display element 186 that connected with each other. The first protecting layer 180 is exposed to the opening 140 of the case 14 for a user to touch or press, and the first protecting layer 180 is connected to a side of the supporting structure 16 adjacent to the opening 140. In this embodiment, a direction D is defined as a direction perpendicular to the top plate 142 of the case 14. Moreover, the display element 186 is located between the first protecting layer 180 and the supporting structure 16, and the display element 186 is connected to the first protecting layer 180 but separated from the supporting structure 16. The display element 186 has a surface 186a away from the first protecting layer 180. The surface 186a of the display element 186 has a height H1 relative to the first protecting layer 180 along the direction D. In some embodiments, the display element 186 is a liquid crystal display (LCD), but the disclosure is not limited thereto. In other embodiments, the display element 186 is an organic light-emitting diode (OLED).

In FIG. 1B and FIG. 1C, the supporting structure 16 includes a bottom plate 160 and a side wall 162. The bottom plate 160 of the supporting structure 16 overlaps the opening 140 of the case 14. And, the bottom plate 160 is separated from the display element 186 of the touch display module 18. In this embodiment, the side wall 162 of the supporting structure 16 is connected between the bottom plate 160 of the supporting structure 16 and the first protecting layer 180 of the touch display module 18. In addition, the side wall 162 surrounds the display element 186 of the touch display module 18 but separated from the display element 186. In detail, the side wall 162 has a first end portion 162a and a second end portion 162b opposite each other. The first end portion 162a of the side wall 162 contacts a surface 180a of the first protecting layer 180, and the second end portion 162b of the side wall 162 contacts the bottom plate 160.

In this embodiment, along the direction D, the bottom plate 160 of the supporting structure 16 has a thickness T1, and the second end portion 162b of the side wall 162 of the supporting structure 16 has a height H2 relative to the first protecting layer 180. The height H2 of the side wall 162 is greater than the height H1 of the display element 186. Since the bottom plate 160 is connected to the second end portion 162b of the side wall 162, a distance between the bottom plate 160 and the first protecting layer 180 is substantially equal to the height H2 of the side wall 162. Therefore, the bottom plate 160 is separated from the display element 186, thereby preventing the bottom plate 160 from contacting the display element 186 and damaging the display element 186.

Figure 2A:
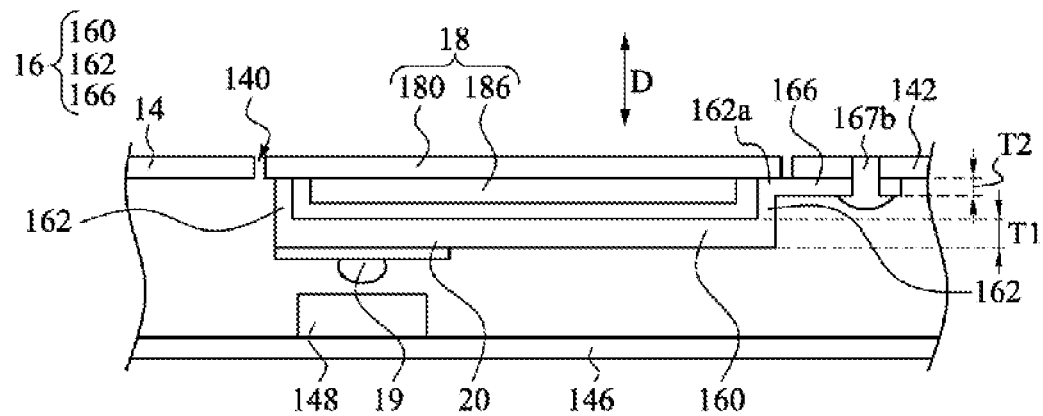
FIG. 2A is a cross-sectional view of the structure shown in FIG. 1B taken along a line segment 2-2.

Refer to FIG. 1B and FIG. 2A. FIG. 2A is a cross-sectional view of the structure shown in FIG. 1B taken along a line segment 2-2. As shown in FIG. 2A, in this embodiment, the supporting structure 16 further includes a connecting portion 166 and at least one fixing member. In an embodiment, there are three fixing members 167a, 167b and 167c and are illustrated in FIG. 1B. In an embodiment, the fixing members 167a, 167b and 167c include screws, but the disclosure is not limited thereto. The connecting portion 166 of the supporting structure 16 is connected between the first end portion 162a of the side wall 162 and the top plate 142 of the case 14, and the connecting portion 166 is fixed to the case 14 by the fixing members 167a, 167b and 167c. In other words, the side wall 162 is engaged with the case 14 by the connecting portion 166. In addition, the side wall 162 supports the bottom plate 160, the touch display module 18, the elastic switch 19 and the circuit board 20 disposed thereon.

In an embodiment, the supporting structure 16 and the top plate 142 of the case 14 are integrally formed without the fixing members 167a, 167b and 167c. In some embodiments, the supporting structure 16 is formed by a stamping process based on the case 14.

In this embodiment, the supporting structure 16 is configured to move partially away from the opening 140 of the case 14. Specifically, the bottom plate 160 of the supporting structure 16 is a cantilever. That is, one end of the bottom plate 160 of the supporting structure 16 is fixedly connected to the case 14 by the side wall 162 and the connecting portion 166. The other end of the bottom plate 160 opposite to the connecting portion 166 moves to close to or away from the opening 140. In this embodiment, the connecting portion 166 has a thickness T2 in the direction D. The thickness T2 of the connecting portion 166 is less than the thickness T1 of the bottom plate 160. When the first protecting layer 180 of the touch display module 18 is pressed by a pressure P (see FIG. 3A and FIG. 3B), the side wall 162 located below the touch display module 18 is also pressed by the pressure P, and therefore the connecting portion 166 is flexed.

Since the thickness T2 of the connecting portion 166 is small, the connecting portion 166 is adapted to be flexible and moves the bottom plate 160 away from the opening 140. In contrast, since the thickness T1 of the bottom plate 160 is large, the bottom plate 160 is not easily deformed when the bottom plate 160 moves away from the opening 140 and is pressed by a corresponding element (such as the pressing member 148) of the case 14. Therefore, the bottom plate 160 is prevented from pressing the display element 186 of the touch display module 18, thereby preventing the damage of the display element 186.

Figure 2B:
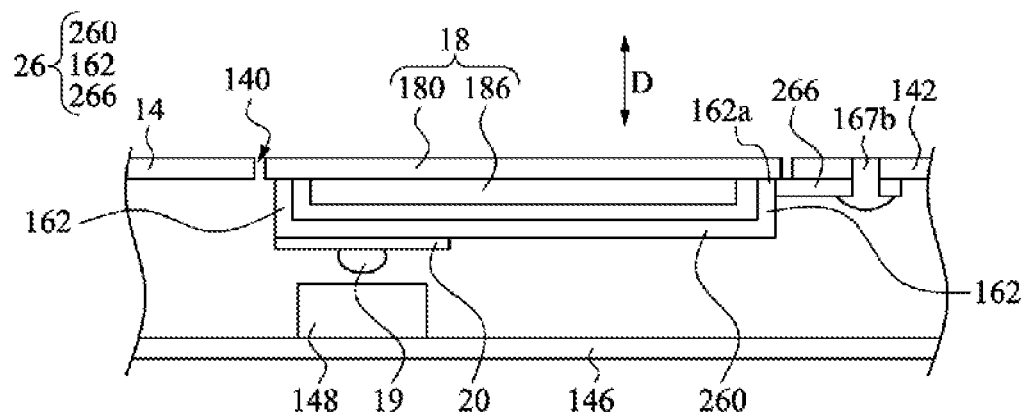
FIG. 2B illustrates a cross-sectional view of a supporting structure according to another embodiment of the disclosure.

Refer to FIG. 2B. FIG. 2B illustrates a cross-sectional view of the electronic device according to an embodiment of the disclosure taken along the line segment 2-2 shown in FIG. 1B. As shown in FIG. 2B, the supporting structure 26 of this embodiment includes a bottom plate 260, a side wall 162 and a connecting portion 266. The structure and function of these elements and the connection relationship between the elements are substantially the same as those of the supporting structure 16 shown in FIG. 2A. Therefore, reference may be made to the above-mentioned related illustration, and details are not described herein again. In this embodiment of FIG. 2B, the rigidity of the material of the bottom plate 260 of the supporting structure 26 is greater than the rigidity of the material of the connecting portion 266.

Since the rigidity of the connecting portion 266 is low, the connecting portion 266 is flexible and moves the bottom plate 260 away from the opening 140 when the connecting portion 266 is under pressing. In contrast, when the bottom plate 260 is with high rigidity, the bottom plate 260 is not easily deformed by being pressed when the bottom plate 260 is moved away from the opening 140 and is pressed by a corresponding element (such as the pressing member 148) of the case 14. Therefore, the bottom plate 260 is prevented from pressing the display element 186 of the touch display module 18, thereby preventing the damage of the display element 186.

In FIG. 1C, the elastic switch 19 and the circuit board 20 are located on a side of the supporting structure 16 opposite to the opening 140 of the case 14 and the elastic switch 19 and the circuit board 20 are connected to the supporting structure 16. The circuit board 20 is disposed between the elastic switch 19 and the bottom plate 160 of the supporting structure 16. In this embodiment, the elastic switch 19 is a metal dome, but the disclosure is not limited thereto. In this embodiment, when the elastic switch 19 is not pressed, a circuit on the circuit board 20 is in a non-conducting state. In contrast, when the elastic switch 19 is pressed as shown in FIG. 3A and FIG. 3B, the elastic switch 19 conducts the circuit on the circuit board 20 such that the circuit board 20 transmits a signal to the motherboard for subsequent corresponding signal processing.

Figure 3A:
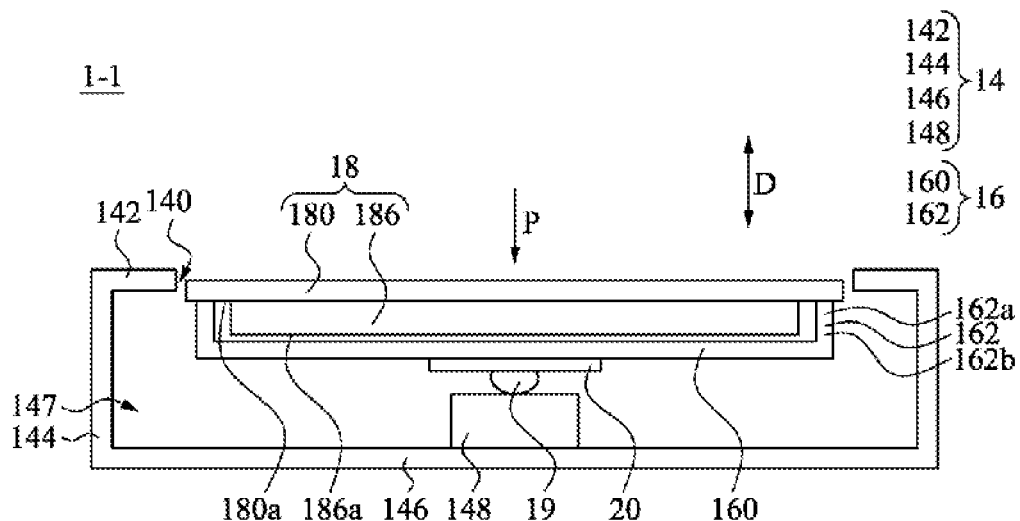
FIG. 3A and FIG. 3B are respectively cross-sectional views of the structure shown in FIG. 1B taken along the line segment 1-1 and the line segment 2-2, wherein the touch display module is subjected to a pressure such that a connecting portion of the supporting structure is flexed.
Figure 3B:
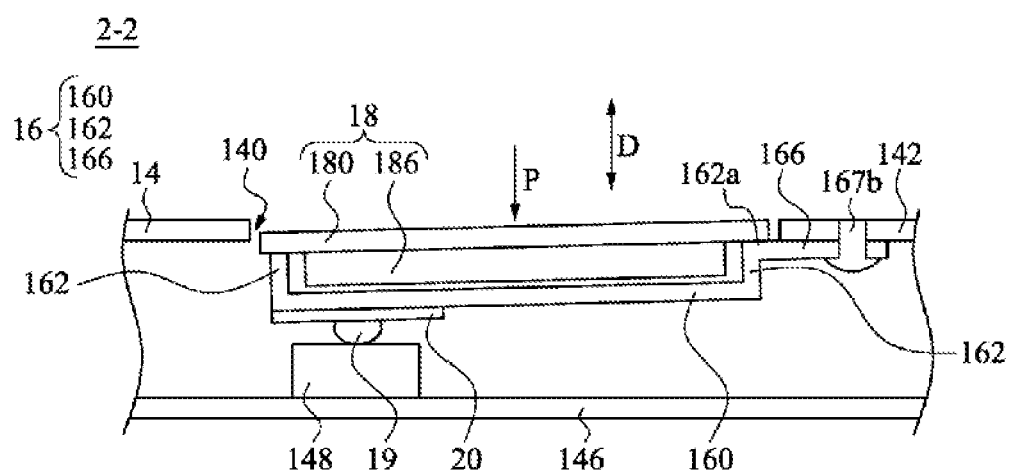

Refer to FIG. 3A and FIG. 3B. FIG. 3A and FIG. 3B are respectively cross-sectional views of the structure shown in FIG. 1B taken along the line segment 1-1 and the line segment 2-2. As shown in FIG. 3A and FIG. 3B, in this embodiment, when the user presses the first protecting layer 180 from the opening 140 of the case 14 and the first protecting layer 180 of the touch display module 18 receives a pressure P from the user, the side wall 162 (see FIG. 2A) located below the touch display module 18 simultaneously receives the pressure P such that the connecting portion 166 (see FIG. 2A) is flexed.

Then, when a part of the bottom plate 160 opposite to the connecting portion 166 moves away from the opening 140 and toward the base 146 of the case 14, the elastic switch 19 disposed on the bottom plate 160 is pressed toward the pressing member 148 of the case 14. When the elastic switch 19 is pressed, the elastic switch 19 conducts the circuit on the circuit board 20 such that the circuit board 20 transmits the signal to the motherboard for subsequent corresponding signal processing.

Since the elastic switch 19 is disposed below the touch display module 18, the touch display module 18 moves close to the base 146 by the supporting structure 16 to give physical feedback corresponding to the pressing of the user when the user presses the touch display module 18. Therefore, the touch display module 18 is configured to control the cursor function and perform the button function when the corresponding button on the first protecting layer 180 is pressed. Moreover, since the elastic switch 19 of the disclosure is disposed below the touch display module 18, a space below the touch display module 18 is effectively utilized, thereby reducing the size of the electronic device 1 and being convenient for the user to carry.

In some embodiments, as shown in FIG. 1B, the first protecting layer 180 of the touch display module 18 has button regions 180L and 180R and a cursor region 180S. The button regions 180L and 180R, or a cursor region 180S transmits a signal when it is pressed by the user, but the disclosure is not limited thereto. The user operates the cursor via providing gestures on the cursor region 180S, performs a function of a left mouse button by touching the button region 180L, and performs a function of a right mouse button by touching the button region 180.

Figure 4A:
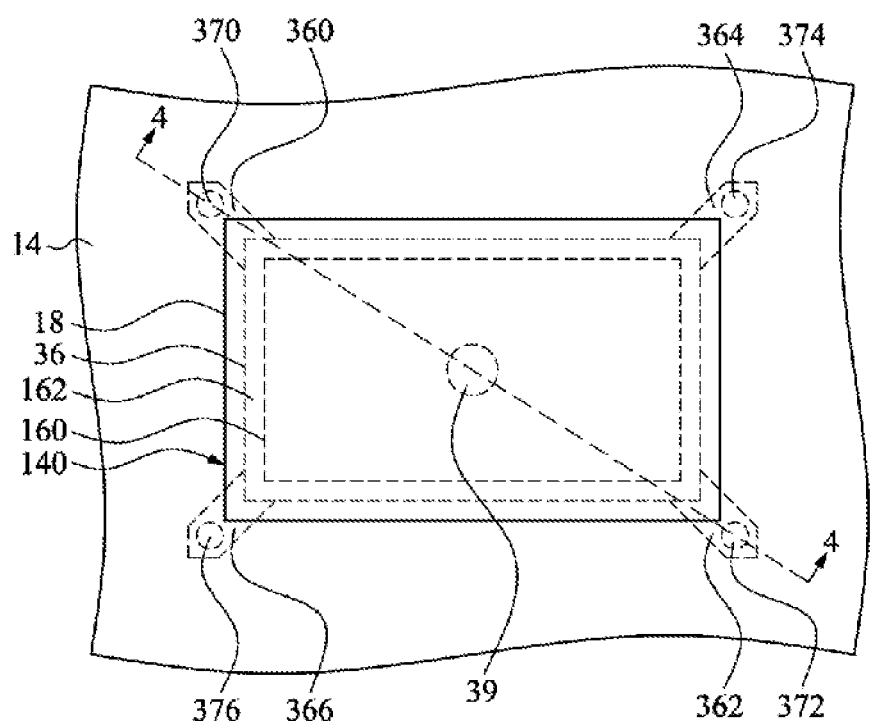
FIG. 4A is a partial structure top view of an electronic device according to another embodiment of the disclosure.
Figure 4B:
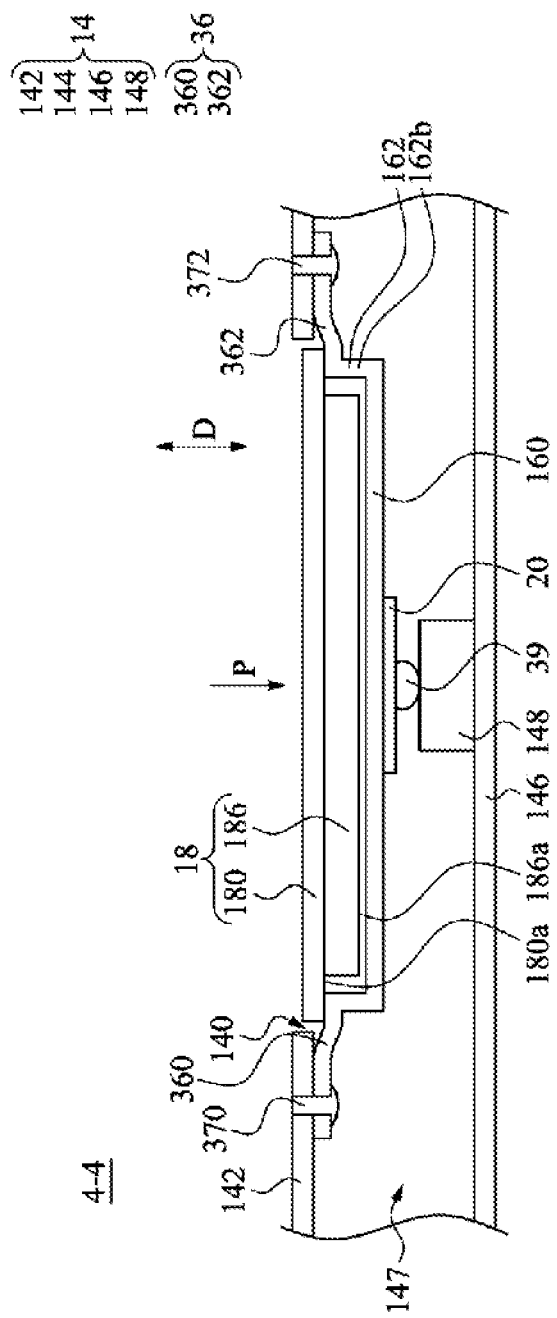
FIG. 4B is a cross-sectional view of a structure shown in FIG. 4A taken along a line segment 4-4, wherein the touch display module is subjected to a pressure such that the connecting portions of the supporting structure are flexed.

Refer to FIG. 4A and FIG. 4B. FIG. 4A illustrates a partial structure top view of an electronic device 3 according to another embodiment of the disclosure. FIG. 4B is a cross-sectional view of a structure shown in FIG. 4A taken along a line segment 4-4, wherein the touch display module 18 receives a pressure such that the connecting portions (only the connecting portions 360 and 362 are illustrated in FIG. 4B) of the supporting structure 36 are flexed. The electronic device 3 of this embodiment includes a first body 10 and a second body 12 that are pivotally connected to each other as shown in FIG. 1A. The structure and function of these elements and the connection relationship between the elements are substantially the same as those of the electronic device 1 shown in FIG. 1A to FIG. 1C thus the related description, and details are omitted here. It should be noted here that the difference between this embodiment illustrated in FIG. 4A and the embodiment as shown in FIG. 1A to FIG. 1C is that the supporting structure 36 includes a plurality of connecting portions 360, 362, 364 and 366, and a plurality of fixing members includes fixing members 370, 372, 374 and 376. Therefore, in this embodiment illustrated in FIG. 4A, the supporting structure 16 as shown in FIG. 1B is replaced with the supporting structure 36.

In this embodiment, the connecting portions 360, 362, 364 and 366 of the supporting structure 36 are respectively connected between the first end portion 162a of the side wall 162 and the case 14, and the connecting portions 360, 362, 364 and 366 are respectively located at four corners of the bottom plate 160. That is, the connecting portion 360 and the connecting portion 362 of the supporting structure 36 are respectively located at two opposite corners of the bottom plate 160 (see FIG. 4B), and the connecting portion 364 and the connecting portion 366 are located at the other two opposite corners of the bottom plate 160. The connecting portions 360, 362, 364 and 366 of the supporting structure 36 are respectively fixed to the case 14 by the fixing members 370, 372, 374 and 376.

As shown in FIG. 4B, when the first protecting layer 180 is subjected to a pressure P, the side wall 162 located below the touch display module 18 receives the pressure P and the connecting portions 360, 362, 364 and 366 are flexed. Then, a part of the bottom plate 160 away from the connecting portions 360, 362, 364 and 366 moves toward the base 146 of the case 14, such that the elastic switch 39 disposed on the bottom plate 160 is pressed between the bottom plate 160 of the supporting structure 16 and the pressing member 148 of the case 14. When the elastic switch 39 is pressed, the elastic switch 39 conducts a circuit on a circuit board 30 to trigger the circuit board 30 to transmit a signal to the motherboard for subsequent corresponding signal processing.

Figure 5A:
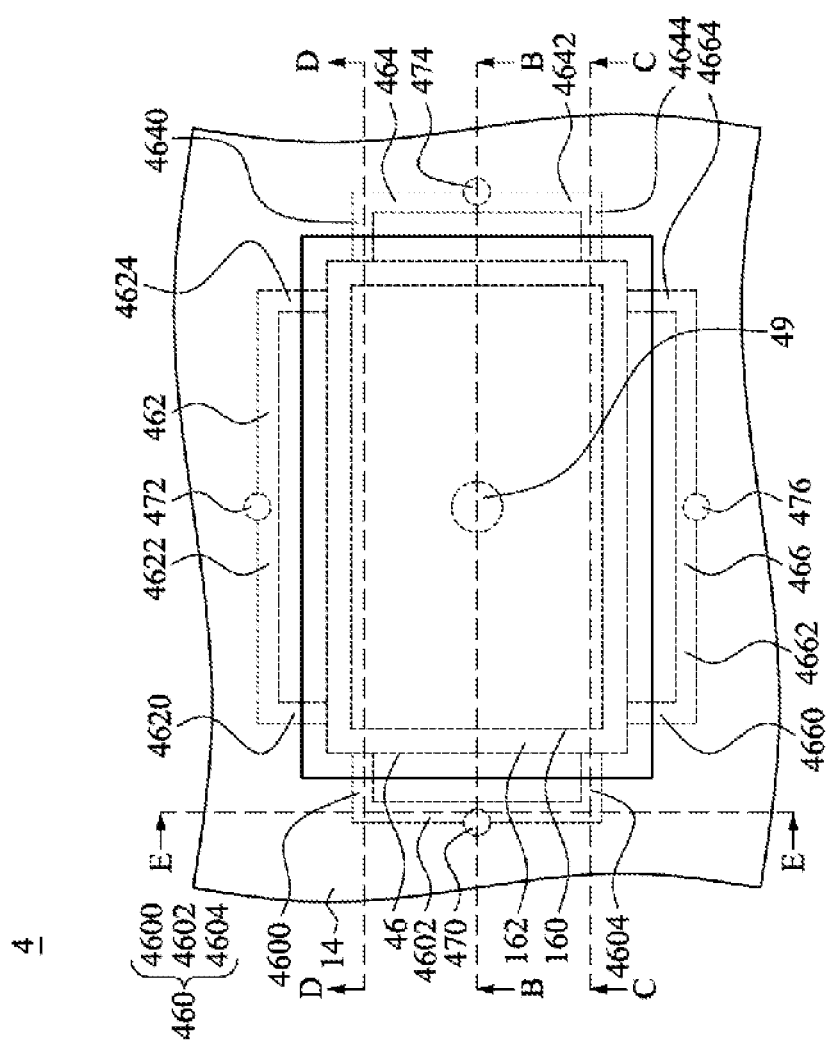
FIG. 5A illustrates a partial structure top view of an electronic device according to still another embodiment of the disclosure.
Figure 5B:
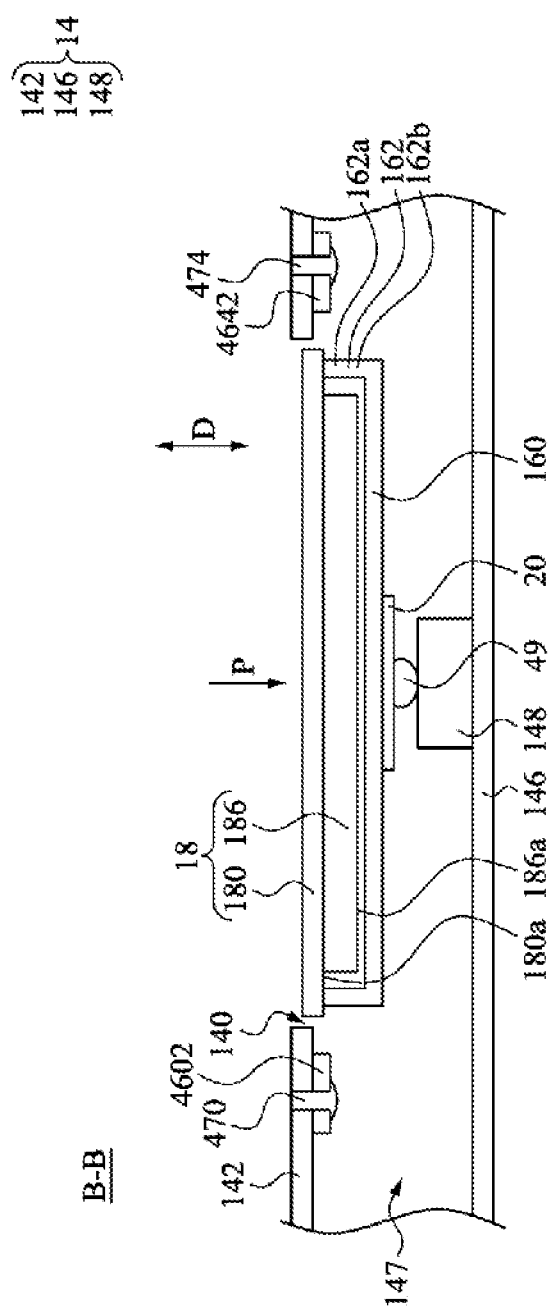
FIG. 5B, FIG. 5C, FIG. 5D and FIG. 5E are respectively cross-sectional views of a structure shown in FIG. 5A taken along a line segment B-B, a line segment C-C, a line segment D-D and a line segment E-E, wherein the touch display module is subjected to a pressure such that connecting portions of a supporting structure are flexed.
Figure 5C:
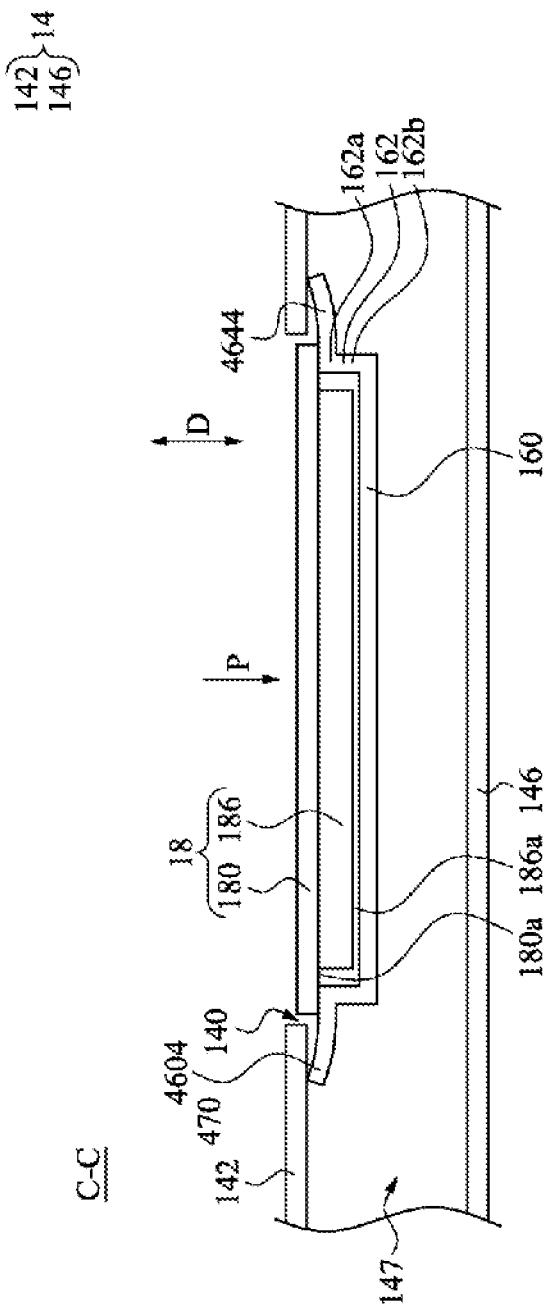
Figure 5D:
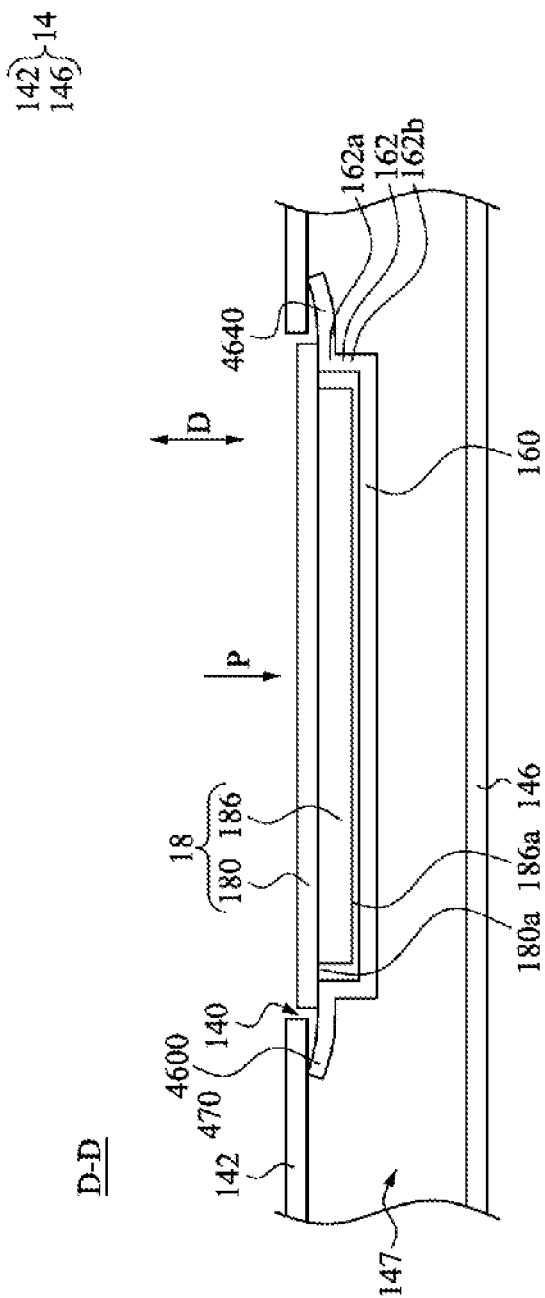
Figure 5E:
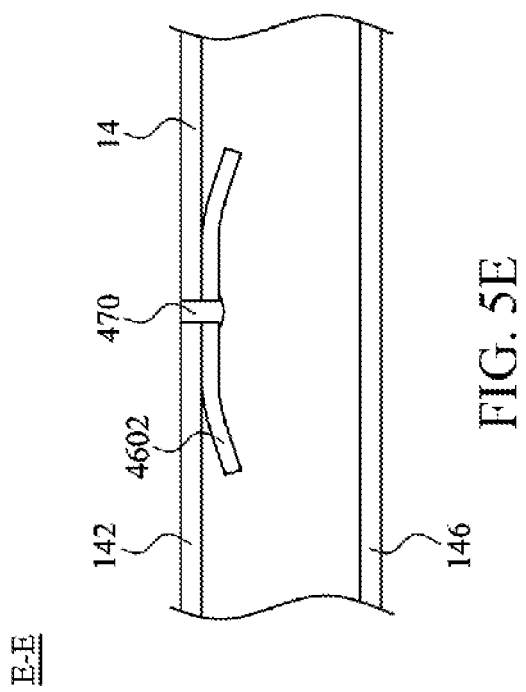

Refer to FIG. 5A, FIG. 5B, FIG. 5C, FIG. 5D and FIG. 5E. FIG. 5A illustrates a partial structure top view of an electronic device 4 according to still another embodiment of the disclosure. FIG. 5B, FIG. 5C, FIG. 5D and FIG. 5E are respectively cross-sectional views of a structure shown in FIG. 5A taken along a line segment B-B, a line segment C-C, a line segment D-D and a line segment E-E. When the touch display module 18 receives a pressure, the connecting portions (only the connecting portions 460 and 464 are illustrated in FIG. 5B to FIG. 5E) of the supporting structure 46 are flexed. The electronic device 4 of this embodiment includes a first body 10 and a second body 12 that are pivotally connected to each other as shown in FIG. 1A. The structure and function of these elements and the connection relationship between the elements are substantially the same as those of the electronic device 1 shown in FIG. 1A to FIG. 1C. Therefore, the above-mentioned related illustration and details are omitted here. It should be noted here that the difference between this embodiment and the embodiment as shown in FIG. 1A to FIG. 1C is the supporting structure 46 includes a plurality of connecting portions such as the connecting portions 460, 462, 464 and 466 illustrated in FIG. 5A and a plurality of fixing members such as the fixing members 470, 472, 474 and 476 illustrated in FIG. 5A. Therefore, in this embodiment, the supporting structure 16 as shown in FIG. 1B is replaced with the supporting structure 46.

In an embodiment, as shown in FIG. 5A, the connecting portion 460 is bent to form a first section 4600, a second section 4602 and a third section 4604 that are sequentially connected and intersect. The first section 4600 and the third section 4604 of the connecting portion 460 are respectively connected to two opposite ends of the second section 4602 and are substantially perpendicular to the second section 4602, but the disclosure is not limited thereto. Furthermore, the first section 4600 and the third section 4604 are connected to an end of the side wall 162 of the supporting structure 46 opposite to the bottom plate 160 (see FIG. 5C and FIG. 5D). In contrast, the second section 4602 of the connecting portion 460 is fixed to the case 14 by the fixing member 470 (see FIG. 5B).

In this embodiment, the structure configuration of the connecting portions 462, 464 and 466 is substantially the same as that of the connecting portion 460. That is, the first section 4620, the second section 4622 and third section 4624 of the connecting portion 462 correspond to the first section 4600, the second section 4602 and third section 4604 of the connecting portion 460. Similarly, the first section 4640, the second section 4642 and the third section 4644 of the connecting portion 464 correspond to the first section 4600, the second section 4602 and the third section 4604 of the connecting portion 460, and the first section 4660, the second section 4662 and the third section 4664 of the connecting portion 462 correspond to the first section 4600, the second section 4602 and third sections 4604 of the connecting portion 460. The connecting portions 460, 462, 464 and 466 of the supporting structure 46 are respectively fixed to the case 14 by the fixing members 470, 472, 474 and 476. Therefore, the flexing degrees of the connecting portions 460, 462, 464 are increased in a limited space by the sections of the connecting portions 460, 462, 464 and 466.

As shown in FIG. 5B to FIG. 5E, when the first protecting layer 180 receives a pressure P, the side wall 162 located below the touch display module 18 simultaneously receives the pressure P. Therefore, the connecting portions 460, 462, 464 and 466 are flexed. Then, a part of the bottom plate 160 away from the connecting portions 460, 462, 464 and 466 moves toward the base 146 of the case 14. Therefore, the elastic switch 49 disposed on the bottom plate 160 is pressed between the bottom plate 160 of the supporting structure 16 and the pressing member 148 of the case 14 (see FIG. 5B).

Figure 6A:
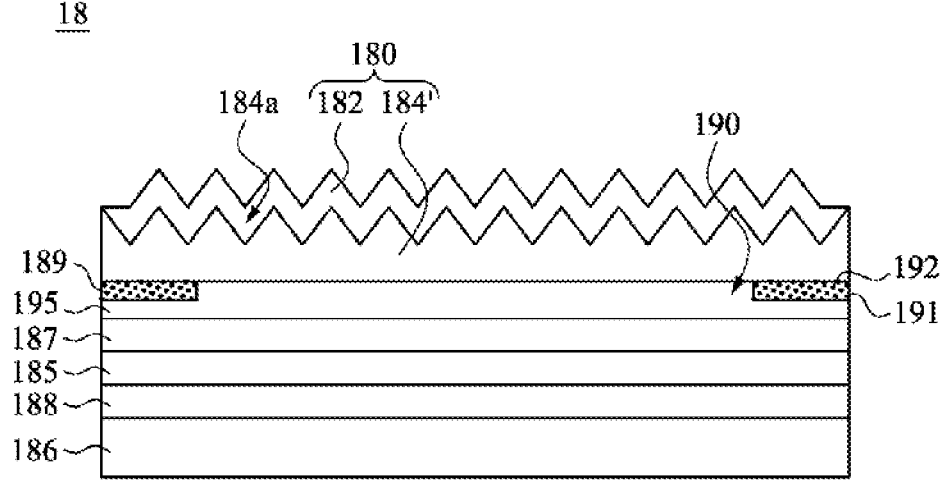
FIG. 6A illustrates a cross-sectional view of a touch display module according to an embodiment of the disclosure.

Refer to FIG. 6A. FIG. 6A illustrates a cross-sectional view of a touch display module 18 according to an embodiment of the disclosure. As shown in FIG. 6A, in this embodiment, a first protecting layer 180 of the touch display module 18 includes a touch layer 182 and a light adjustment layer 184'. The light adjustment layer 184' is located between the touch layer 182 and a display element 186. In this embodiment, the light adjustment layer 184' has a plurality of multi-dimensionally arranged grooves 184a. The light adjustment layer 184' utilizes a surface uniform anti-glare manner to achieve the effect of scattering reflected light, thereby reducing the reflected light on the surface of the light adjustment layer 184' to reduce the visual interference of the light.

In some embodiments, an arithmetic mean roughness (Ra) of the light adjustment layer 184' is between about 0.4 micron ($\mu m$) and about 0.6 micron ($\mu m$). In some embodiments, an average peak spacing (Rsm) of the light adjustment layer 184' is between about 60 microns ($\mu m$) and about 160 microns ($\mu m$), such that the protecting layer 180 achieves an anti-glare effect. The material of the light adjustment layer 184' includes soda-lime glass, aluminosilicate glass or any other suitable material. A manufacturing method of the grooves 184a on the light adjustment layer 184' includes an imprinting process, a roll to roll process, a spraying process, a wet etching process, a dry etching process or any other suitable process.

In this embodiment, the touch layer 182 of the first protecting layer 180 covers the light adjustment layer 184', wherein the touch layer and the light adjustment layer are conformal. In some embodiments, the touch layer 182 flattens the surface of the first protecting layer 180 to maximize the tension of the surface of the first protecting layer 180, thereby preventing fingerprints from being formed on the first protecting layer 180. In this embodiment, the touch layer 182 is transparent under visible light and infrared rays. In addition, the touch layer 182 has low friction coefficient and high water drop contact angle. In some embodiments, the water drop contact angle of the touch layer 182 is greater than 105°, such that the first protecting layer 180 has good hydrophobicity good anti-fingerprint capability, and has the effects of antifouling, anti-fog, anti-scratch, anti-static, easy-to-wipe. The material of the touch layer 182 includes a reactive silane group, a fluorine modified organic group, any other suitable material, or any combination of the foregoing. In some embodiments, haze of the first protecting layer 180 is between about 22%~28%. In some embodiments, transmittance of the first protecting layer 180 is between about 76%~80%, such that the first protecting layer 180 has anti-glare effect and good visibility. In some embodiments, a measuring instrument used to measure the transmittance of the first protecting layer 180 includes a haze meter (NDH-2000) manufactured by Nippon DENSHOKU INDUSTRIES CO., LTD. However, the disclosure is not limited thereto.

Through the configuration of all layers in the above-mentioned first protecting layer 180, the surface of the touch display module 18 has good hydrophobicity and prevents the fingerprints from being formed on the above-mentioned surface. Moreover, the first protecting layer 180 reduces the reflected light on the surface of the touch display module 18, thereby reducing the visual interference of the light. Therefore, the anti-glare effect of the touch display module 18 is achieved.

As shown in FIG. 6A, in this embodiment, the touch display module 18 further includes a touch sensing layer 185, a first adhesive layer 187, a second adhesive layer 188, a light absorbing layer 189 and a second protecting layer 195. The second protecting layer 195, the first adhesive layer 187, the touch sensing layer 185, the second adhesive layer 188 and the display element 186 are sequentially connected from the first protecting layer 180 to the bottom plate 160 in the touch display module 18. The touch sensing layer 185 of the touch display module 18 is configured to sense the touch action of the user. When the user approaches and/or contacts the first protecting layer 180, the touch sensing layer 185 generates a touch sensing signal.

In some embodiments, the touch sensing layer 185 includes a capacitance sensing element. In one embodiment, the capacitance sensing element determines whether a conductor exist on the first protecting layer 180 to generate a touch sensing signal on the touch sensing layer 185. The capacitance sensing element includes electrodes and/or wires. When a conductor approaches the first protecting layer 180, a capacitance is formed between the conductor and each electrode/wire in the touch sensing layer 185. The capacitance of each electrode/wire is measured by a capacitance sensing circuit or a microcontroller (not shown) in the electronic device 1. That is, the change of the capacitance of each electrode/wire is detected by the microcontroller to determine whether a conductor exists on the first protecting layer 180, such that the signal is transmitted to the motherboard by the touch sensing layer 185 for subsequent corresponding signal processing. In some embodiments, the touch sensing layer 185 also includes a resistive touch structure, but the disclosure is not limited thereto.

In this embodiment, the first adhesive layer 187 is used to bond the first protecting layer 180 and the touch sensing layer 185. The material of the first adhesive layer includes an optically clear adhesive (OCA) or any other suitable material. The second adhesive layer 188 bonds the touch sensing layer 185 and the display element 186, and the material of the second adhesive layer includes an optically clear adhesive (OCA) or any other suitable material.

In this embodiment, the second protecting layer 195 is of a single-layer structure. In other embodiments, the second protecting layer 195 is of a multilayer structure. In this embodiment, the material of the second protecting layer 195 includes silicon oxide or silicon nitride, but the disclosure is not limited thereto. The second protecting layer 195 of this embodiment has friction resistance, elongation and tensile strength to protect the touch sensing layer 185 and the display element 186 located below the second protecting layer.

In this embodiment, the light absorbing layer 189 absorbs light emitted from the display element 186, thereby avoiding the problem of light leakage of the display element 186. The light absorbing layer 189 is located between the first protecting layer 180 and the second protecting layer 195 and is patterned to form an opening 190. The opening 190 of the light absorbing layer 189 is filled with the second protecting layer 195, and the second protecting layer 195 is connected to the light adjustment layer 184' of the first protecting layer 180 by the opening 190. In this embodiment, the display element 186 is exposed by the opening 190 of light absorbing layer 189. In other words, the light absorbing layer 189 is embedded in the second protecting layer 195 and is separated from the touch layer 182. The surface of the light absorbing layer 189 away from the touch sensing layer 185 is coplanar with the surface of the second protecting layer 195 away from the touch sensing layer 185.

In detail, the light absorbing layer 189 includes a substrate 191 and light absorbing particles 192. The light absorbing particles 192 of the light absorbing layer 189 are uniformly distributed in the substrate 191. In this embodiment, the material of the substrate 191 of the light absorbing layer 189 is a photosensitive interlayer material, and the photosensitive interlayer material is not limited to a positive or negative photosensitive mechanism. In some embodiments, the material of the substrate 191 of the light absorbing layer 189 includes a polymer material. In an embodiment, the material of the substrate 191 is polyimide (PI), polyvinyl alcohol (PVA) or any other suitable material. In other embodiment, the material of the substrate 191 is acrylate, but the disclosure is not limited thereto. In some embodiments, the light absorbing particles 192 include carbon, a black dye, or any other suitable material.

In some embodiments, a forming method of the light absorbing layer 189 includes an ink printing process.

Figure 6B:
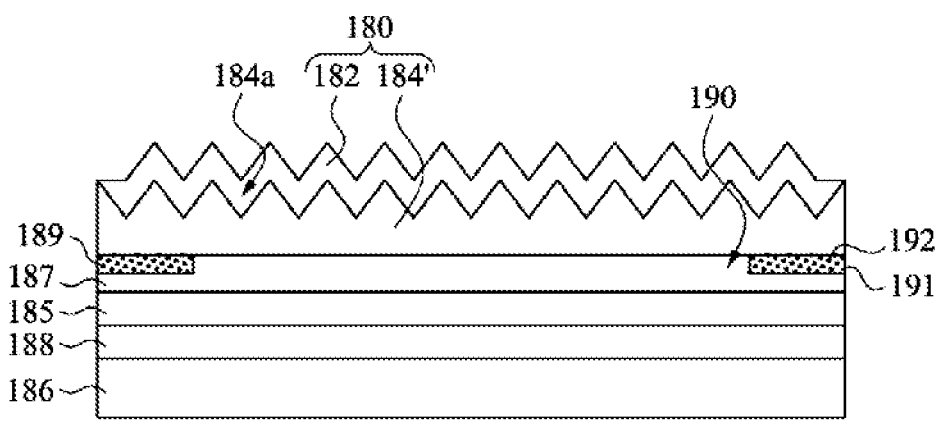
FIG. 6B illustrates a cross-sectional view of a touch display module according to another embodiment of the disclosure.

Refer to FIG. 6B. FIG. 6B illustrates a cross-sectional view of a touch display module 28 according to another embodiment of the disclosure. As shown in FIG. 6B, the touch display module 28 of this embodiment includes a first protecting layer 180, a light absorbing layer 189, a first adhesive layer 187, a touch sensing layer 185, a second adhesive layer 188 and a display element 186. The structure and function of these elements and the connection relationship between the elements are substantially the same as those of the touch display module 18 shown in FIG. 6A. Therefore, the above-mentioned related illustration, and details are omitted here. It should be noted here that the difference between this embodiment and the embodiment shown in FIG. 6A is that in this embodiment, the touch display module 28 omits the second protecting layer 195 disposed as shown in FIG. 6A. Therefore, the opening 190 of the light absorbing layer 189 is filled with the first adhesive layer 187, and the first adhesive layer 187 is connected to the light adjustment layer 184' of the first protecting layer 180 by the opening 190. In other words, the light absorbing layer 189 is embedded in the first adhesive layer 187. The surface of the light absorbing layer 189 away from the touch sensing layer 185 is coplanar with the surface of the first adhesive layer 187 away from the touch sensing layer 185.

Figure 7:
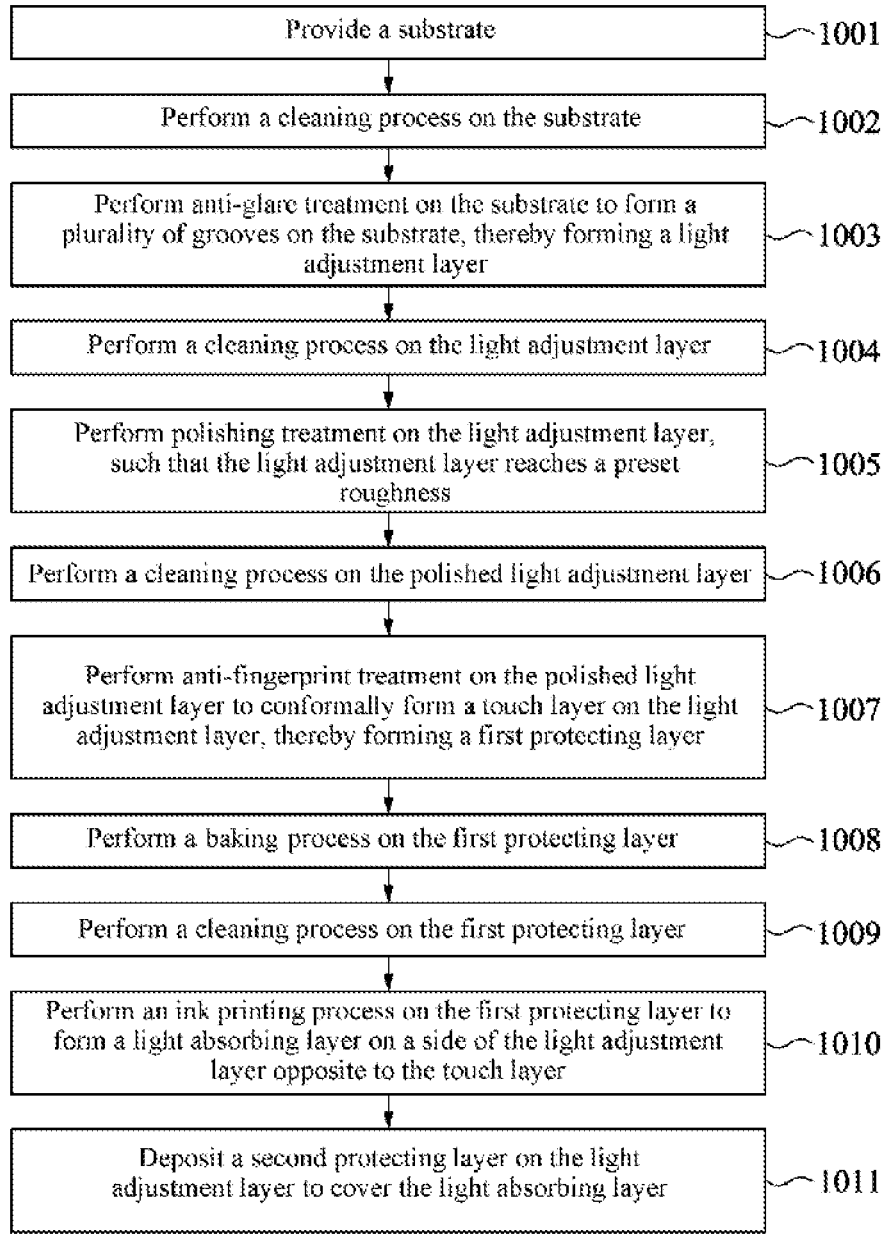
FIG. 7 illustrates a flow chart showing a manufacturing method of a protecting layer in a touch display module according to an embodiment of the disclosure.
Figure 8A:
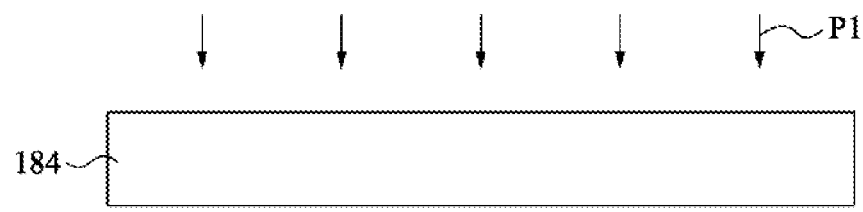
FIG. 8A, FIG. 8B and FIG. 8C respectively illustrate cross-sectional views of a protecting layer in a touch display module according to an embodiment of the disclosure in different intermediate manufacturing stages.
Figure 8B:
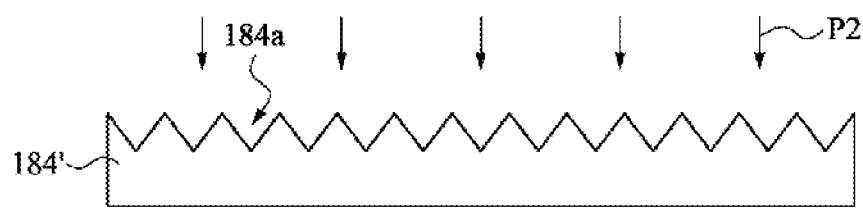
Figure 8C:
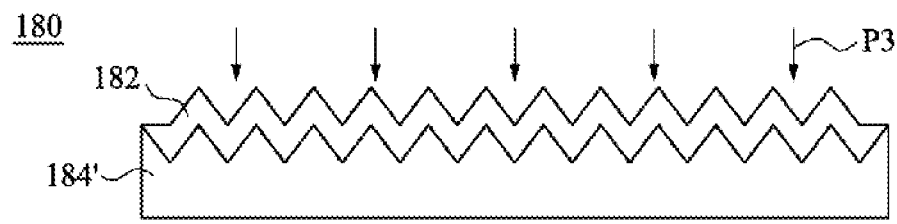

FIG. 7 illustrates a flow chart showing a manufacturing method 1000 of a first protecting layer 180 in a touch display module 18 according to an embodiment of the disclosure. FIG. 8A, FIG. 8B and FIG. 8C respectively illustrate cross-sectional views of a first protecting layer 180 in a touch display module 18 according to an embodiment of the disclosure in different intermediate manufacturing stages.

Although the manufacturing method 1000 of the first protecting layer 180, the light absorbing layer 189 and the second protecting layer 195 disclosed herein is illustrated and described as a series of steps or events, it should be understood that an order in which such steps or events are presented is not construed in a limiting sense. In an embodiment, in addition to the order illustrated and/or described herein, some steps occur in a different order and/or concurrently with other steps or events. In addition, the implementation of one or more aspects or embodiments described herein may not require a full illustrated operation. Further, one or more of the steps depicted herein may be implemented in one or more separate steps and/or stages. Specifically, the manufacturing method 1000 of the first protecting layer 180, the light absorbing layer 189 and the second protecting layer 195 includes step 1001 to step 1011.

In step 1001, a substrate 184 is provided. In this embodiment, the material of the substrate 184 includes soda-lime glass, aluminosilicate glass or any other suitable material.

In step 1002, a cleaning process P1 is performed on the substrate 184. FIG. 8A illustrates some embodiments corresponding to step 1002.

In step 1003, anti-glare (AG) treatment P2 is performed on the substrate 184 to form a plurality of grooves 184a on the substrate 184, thereby forming the light adjustment layer 184'. FIG. 8B illustrates some embodiments corresponding to step 1003. In this embodiment, a method of the anti-glare treatment P2 includes an imprinting process, a roll to roll process, a spraying process, a wet etching process, a dry etching process or any other suitable process.

In step 1004, a cleaning process is performed on the light adjustment layer 184'.

In step 1005, polishing treatment is performed on the light adjustment layer 184' to achieve a preset roughness of the light adjustment layer 184'.

In step 1006, a cleaning process is performed on the polished light adjustment layer 184'.

In step 1007, anti-fingerprint (AF) treatment P3 is performed on the polished light adjustment layer 184' to form a touch layer 182 on the light adjustment layer 184', thereby forming a first protecting layer 180, wherein the touch layer 182 and the light adjustment layer 184' are conformal. FIG. 8C illustrates some embodiments corresponding to step 1007. In this embodiment, a method of the anti-fingerprint treatment P3 includes a coating process or any other suitable process.

In step 1008, a baking process is performed on the first protecting layer 180.

In step 1009, a cleaning process is performed on the baked first protecting layer 180.

In step 1010, an ink printing process is performed on the first protecting layer 180 to form a light absorbing layer 189 on a side of the light adjustment layer 184' opposite to the touch layer 182.

In step 1011, a second protecting layer 195 is deposited on the light adjustment layer 184' to cover the light absorbing layer 189. In this embodiment, the material of the second protecting layer 195 includes silicon oxide, silicon nitride or any other suitable material. A method of depositing the second protecting layer 195 includes an atomic layer deposition (ALD) process, a physical vapor deposition (PVD) process, a chemical vapor deposition (CVD) process or any suitable deposition process. In some embodiments, as shown in FIG. 6B, the second protecting layer 195 is omitted.

From the above detailed description of the specific embodiments of the disclosure, it can be clearly seen that the elastic switch of the disclosure is disposed below the touch display module. Therefore, when the user presses the touch display module, the touch display module is pressed down by the supporting structure to produce physical feedback corresponding to the pressure of the user, such that the user operates the electronic device more accurately. Moreover, since the elastic switch of the disclosure is disposed below the touch display module, the space below the touch display module is effectively utilized, thereby reducing the size of the electronic device and being convenient for the user to carry.

Furthermore, the side wall of the supporting structure of the disclosure has a first height relative to the protecting layer. The display element has a second height relative to the protecting layer. The first height of the side wall is greater than the second height of the display element. Since the bottom plate is connected to an end of the side wall opposite to the protecting layer, the distance between the bottom plate and the protecting layer is greater than the height of the side wall, thereby preventing the bottom plate from contacting the display element and damaging the display element when the user presses the touch display module.

Features of the multiple embodiments described above enable persons of ordinary skill in the art to better understand each aspect of the disclosure. Persons of ordinary skill in the art should understand that, to achieve the same objective and/or same advantage of the embodiments mentioned in the disclosure, designs or modifications involving other processes or structures based on the disclosure are obvious. Persons of ordinary skill in the art should also understand that, these equivalent structures do not depart from the spirit and scope of the disclosure, and various changes, replacement, and amendments can be made without departing from the spirit and scope of the disclosure.

What is claimed is:

1. An electronic device, comprising:
   a case, having an opening;
   a supporting structure, disposed in the case and comprising a bottom plate covering the opening and a sidewall that is directly on a top surface of the bottom plate and connected to the case;
   a touch display module, comprising a protecting layer and a display element stacked on a bottom surface of the protecting layer, wherein the protecting layer is connected to a top surface of the sidewall, and the display element is located between the protecting layer and the bottom plate and separated from the bottom plate; and
   an elastic switch, located at a side of the bottom plate opposite to the opening of the case, wherein when the supporting structure moves partially away from the opening of the case, the elastic switch is pressed toward the case.

2. The electronic device according to claim 1, wherein the elastic switch is connected to the bottom plate.

3. The electronic device according to claim 1, wherein the side wall is connected between the bottom plate and the protecting layer and engaged with the case.

4. The electronic device according to claim 1, wherein the sidewall has a first height relative to the protecting layer, the display element has a second height relative to the protecting layer, and the second height is less than the first height.

5. The electronic device according to claim 1, wherein the bottom plate is a cantilever.

6. The electronic device according to claim 1, wherein the supporting structure further comprises a first connecting portion connected between the case and an end portion of the side wall opposite to the bottom plate.

7. The electronic device according to claim 6, wherein the first connecting portion is bent to form a first section and a second section intersecting with each other, the first section is connected to the end portion of the side wall, and the second section is connected to the case.

8. The electronic device according to claim 6, wherein the bottom plate has a first thickness, the first connecting portion has a second thickness, and the second thickness is less than the first thickness.

9. The electronic device according to claim 6, wherein the supporting structure further comprises a second connecting portion located on a side of the bottom plate opposite to the first connecting portion and connected between the case and the end portion of the side wall.

10. The electronic device according to claim 1, wherein the protecting layer comprises a touch layer and a light adjustment layer located between the touch layer and the display element, a surface of the light adjustment layer adjacent to the touch layer has a plurality of grooves, and the touch layer covers the light adjustment layer, wherein the touch layer and the light adjustment layer are conformal.

11. The electronic device according to claim 10, wherein an arithmetic mean roughness (Ra) of the light adjustment layer is between 0.4 micron (μm) and 0.6 micron (μm), and an average peak spacing (Rsm) of the light adjustment layer is between 60 microns (μm) and 160 microns (μm).

12. The electronic device according to claim 10, wherein the touch layer has a water drop contact angle, and the water drop contact angle is greater than 105 degrees.

13. The electronic device according to claim 1, wherein haze of the protecting layer is between 22% and 28%, and transmittance of the protecting layer is between 76% and 80%.

* * * * *